(12) United States Patent
Mahindra et al.

(10) Patent No.: US 10,122,547 B2
(45) Date of Patent: Nov. 6, 2018

(54) ENABLING HIGH-BANDWIDTH, RESPONSIVE MOBILE APPLICATIONS IN LTE NETWORKS

(71) Applicant: NEC Laboratories America, Inc., Princeton, NJ (US)

(72) Inventors: Rajesh Mahindra, Princeton, NJ (US); Karthikeyan Sundaresan, Howell, NJ (US); Junguk Cho, Salt Lake, UT (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 93 days.

(21) Appl. No.: 15/237,485

(22) Filed: Aug. 15, 2016

(65) Prior Publication Data

US 2017/0048876 A1   Feb. 16, 2017

Related U.S. Application Data

(60) Provisional application No. 62/205,318, filed on Aug. 14, 2015, provisional application No. 62/212,060, filed on Aug. 31, 2015.

(51) Int. Cl.
*H04W 4/00* (2018.01)
*H04L 12/46* (2006.01)
(Continued)

(52) U.S. Cl.
CPC ...... *H04L 12/4633* (2013.01); *H04L 12/1407* (2013.01); *H04L 12/407* (2013.01); *H04L 12/66* (2013.01); *H04L 47/2441* (2013.01); *H04W 4/00* (2013.01); *H04W 76/00* (2013.01); *H04L 67/1036* (2013.01)

(58) Field of Classification Search
CPC ............... H04L 12/1407; H04L 12/407; H04L 12/4633; H04L 12/66; H04L 47/2441; H04L 67/1036; H04W 4/00; H04W 76/00
See application file for complete search history.

(56) References Cited

U.S. PATENT DOCUMENTS

| | | | |
|---|---|---|---|
| 2012/0131178 A1* | 5/2012 | Zhu | H04L 67/1004 709/224 |
| 2018/0007571 A1* | 1/2018 | Chandramouli | H04W 24/04 |

OTHER PUBLICATIONS

Cho, et al., "SMORE: Software-Defined Networking Mobile Offloading Architecture", All Things Cellular, Aug. 2014, pp. 21-26.
(Continued)

*Primary Examiner* — Kan Yuen
(74) *Attorney, Agent, or Firm* — Joseph Kolodka

(57) ABSTRACT

Systems and methods for standards compatible Mobile Edge Computing (MEC), including splitting Serving gateways (SGWs) and Packet Data Network gateways (PDN-GWs) to provision sufficient resources to deploy data-plane entity instances locally at a Radio Access Network (RAN) edge with one or more cloudlets. One or more local controller nodes is deployed in one or more operator clouds, a dedicated bearer is leveraged to route traffic from the one or more cloudlets through the split SGWs and PDN-GWs, and the dedicated bearer is configured with a traffic flow template (TFT) including an Internet Protocol (IP) address of the one or more cloudlets. Efficient access to one or more MEC applications at the RAN edge is provided to one or more user devices using the dedicated bearer.

20 Claims, 7 Drawing Sheets

(51) Int. Cl.
    *H04L 12/66*     (2006.01)
    *H04L 12/851*     (2013.01)
    *H04L 12/14*     (2006.01)
    *H04L 12/407*     (2006.01)
    *H04W 76/00*     (2018.01)
    *H04L 29/08*     (2006.01)

(56) References Cited

OTHER PUBLICATIONS

Qualcomm, "Device-to-Device Discovery Technology", LTE Direct https://www.qualcomm.com/invention/research/projects/lte-direct, Last accessed Aug. 15, 2016, 5 pages.
Patel, et al., "Mobile-Edge Computing", Introductory Techincal White Paper, Sep. 2014, pp. 1-36.
Alcatel-Lucent, "The Journey to Packet Core Virtualization", Technology White Paper, Feb. 2014, 12 pages.
Tamura, et al., 3GPP, "The Mobile Broadband Standard EDGE+ LTE", http: //www.3gpp.org/DynaReport/29060.htm, Last Accessed on Aug. 15, 2016, 7 pages.
Chiosi, et al., "Network Functions Virtualisation", Introductory White Paper, SDN and OpenFlow World Congress, Oct. 2012, pp. 1-16.
WiFi Alliance, Discover Wi-Fi, Wi-Fi Aware, http://www.wi-fi.org/discover-wi-fi/wi-fi-aware, Last accessed on Aug. 15, 2016, 4 pages.
Kline, "How Bluetooth Beacons Will Transform Retail in 2016", The Huffington Post, Jan. 2016, 5 pages.
Wang et al., "MobiScud: A Fast Moving Personal Cloud in the Mobile Network", All Things Cellular, Aug. 2015, pp. 1-6.
NEC's vEPC Solutions: Virtualization Mobile Core Network Solutions | NEC,4. http://www.nec.com/en/global/solutions/tcs/vepc/, Last accessed Aug. 15, 2016, 2 pages.

\* cited by examiner

ENABLING HIGH-BANDWIDTH, RESPONSIVE MOBILE APPLICATIONS IN LTE NETWORKS

RELATED APPLICATION INFORMATION

This application claims priority to provisional application No. 62/205,318 filed Aug. 14, 2015, and provisional application No. 62/212,060 filed Aug. 31, 2015, the contents of which are incorporated herein by reference.

BACKGROUND

Technical Field

The present invention relates generally to edge computing over networks, and more particularly, to proximity-empowered edge computing over mobile networks.

Description of the Related Art

Recently, there has been a surge in data traffic on LTE networks, forcing mobile operators to constantly increase network investments. At the same time, as networks evolve from being voice-dominated to being data-dominated, operators are finding it harder to compete with OTT (Over-the-top) services provided by, for example, Google®, Facebook®, etc. To avoid being reduced to bit-pipes, different platforms have been employed to enable a newer generation of applications and services over mobile networks.

Mobile-edge Computing (MEC) provides a new revenue stream for operators by allowing them to open their Radio Access Network (RAN) edge to authorized third-party service providers. Specifically. MEC platforms provides cloud-computing capabilities at the edge of Long Term Evolution (LTE) networks. Such platforms enable application developers to flexibly and rapidly deploy innovative services for both consumer and enterprise segments. By providing services in close proximity to the users, the services can leverage the high-bandwidth and low-latency along with access to real time radio network information, such as subscriber location, cell load etc. Some categories of services that may be enabled by MEC platforms include consumer-based services, enterprise services, and network performance services.

Conventional LTE network architecture limits the placement of cloudlets or compute servers close to or within a Radio Access Network (RAN). The primary reason for this limitation is that the user traffic is carried over General Packet Radio Service (GPRS) Tunneling Protocol (GTP) based User Datagram Protocol (UDP) tunnels between Evolved Node B (eNodeB) and the Serving Gateways (SGWs). Although the traffic between the eNodeBs and the SGWs is carried over IP, the additional GTP and UDP headers over the inner Internet Protocol (IP) headers ensure that regular switches cannot be deployed to dynamically switch traffic to locally deployed MEC Servers.

One conventional solution is to change the implementation of the LTE eNodeB and the SGWs to incorporate local traffic offload for selective traffic meant for MEC applications. However, such an approach is expensive requiring changes to already deployed eNodeBs and may cause an increase in the costs of eNodeBs. Moreover, it would require changes to the 3 Generic Packetized Protocol (3GPP) standards for inter-operability and backward compatibility.

SUMMARY

A computer implemented method for standards compatible Mobile Edge Computing (MEC), including splitting Serving gateways (SGWs) and Packet Data Network gateways (PDN-GWs) to provision sufficient resources to deploy data-plane entity instances locally at a Radio Access Network (RAN) edge with one or more cloudlets. One or more local controller nodes is deployed in one or more operator clouds, a dedicated bearer is leveraged to route traffic from the one or more cloudlets through the split SGs and PDNs, and the dedicated bearer is configured with a traffic flow template (TFT) including an Internet Protocol (IP) address of the one or more cloudlets. Efficient access to one or more MEC applications at the RAN edge is provided to one or more user devices using the dedicated bearer.

A system for standards compatible Mobile Edge Computing (MEC), including a splitter for splitting Serving gateways (SGWs) and Packet Data Network gateways (PDN-GWs) to provision sufficient resources to deploy data-plane entity instances locally at a Radio Access Network (RAN) edge with one or more cloudlets, and a processor coupled to a computer-readable storage medium. The processor is configured to deploy one or more local controller nodes in one or more operator clouds, leverage a dedicated bearer to route traffic from the one or more cloudlets through the split SGs and PDNs, configure the dedicated bearer with a traffic flow template (TFT) including an Internet Protocol (IP) address of the one or more cloudlets, and provide one or more user devices efficient access to one or more MEC applications at the RAN edge using the dedicated bearer.

A computer-readable storage medium including a computer-readable program for standards compatible Mobile Edge Computing (MEC), wherein the computer-readable program when executed on a computer causes the computer to perform the steps of splitting Serving gateways (SGWs) and Packet Data Network gateways (PDN-GWs) to provision sufficient resources to deploy data-plane entity instances locally at a Radio Access Network (RAN) edge with one or more cloudlets. One or more local controller nodes is deployed in one or more operator clouds, a dedicated bearer is leveraged to route traffic from the one or more cloudlets through the split SGs and PDNs, and the dedicated bearer is configured with a traffic flow template (TFT) including an Internet Protocol (IP) address of the one or more cloudlets. Efficient access to one or more MEC applications at the RAN edge is provided to one or more user devices using the dedicated bearer.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
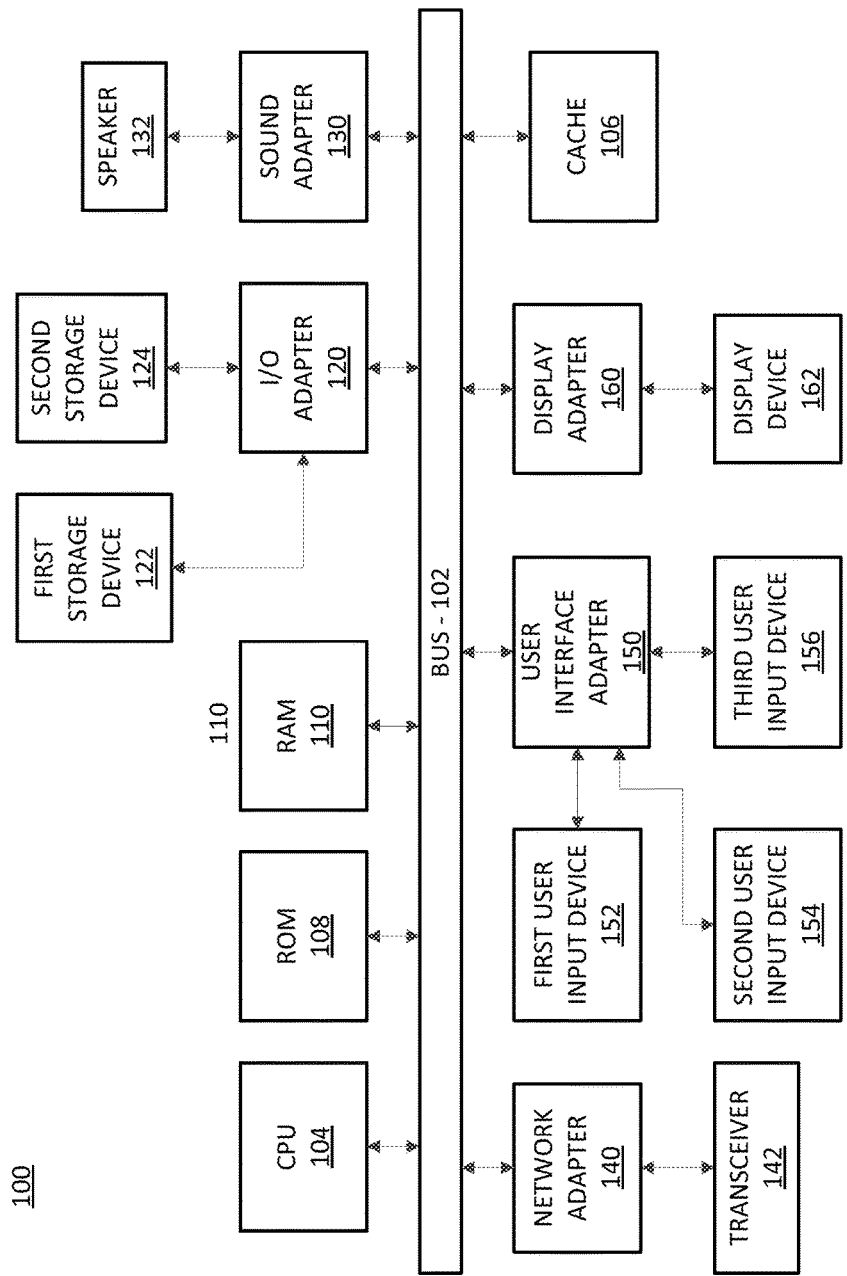
FIG. 1 is a block/flow diagram illustrating an exemplary processing system to which the present principles may be applied, in accordance with the present principles.

In accordance with the present principles, systems and methods are provided for mobile edge computing (MEC) using a standards compatible framework according to various embodiments.

In a particularly useful embodiment, the present principles may be employed to provision computing resources for MEC at the Radio Access Network (RAN) edge using a standards compatible framework according to the present principles. In some embodiments, mobile applications demanding high compute, high-bandwidth and low latency at scale (e.g., Augmented Reality (AR), Gaming. Large-scale analytics, video surveillance. Internet of Things (IoT) location tracking, etc.) may employ MEC to bring Compute Resources (e.g., cloudlets) close to the mobile edge in accordance with the present principles.

Some applications or services that can be enabled by the MEC platform according to the present principles include consumer-based services, enterprise services, and Network performance services, as described in further detail herein below.

Consumer-based services: Several applications such as Augmented/Assisted Reality (AR). Gaming and Video Analytics are compute intensive to run on the devices, and offloading the computation to the cloud degrades performance due to high bandwidth requirements. Deploying such services as cloudlets at the edge of the network can enable these applications on today's mobile networks. Other services such as Mobile Advertising can be enhanced using context information such as user-location, user-activity etc., that are available at the RAN edge. AR may provide a richer, more engaging & personal (user-centric) experience, and may be employed in a plurality of situations (e.g., Retail, Stadiums. Tourism, Energy, Health, etc.). However, such applications are not feasible on today's LTE networks since they suffer from high network delays and computational delays.

Enterprise services: Besides applications that directly benefit the end-user, several services that can take advantage of compute and storage at the RAN edge are valuable to businesses and enterprises. Applications such as active device location tracking, big data analytics, video surveillance and monitoring, and security services are becoming increasingly important. With the advent of Internet of Things (IoT), such applications are growing in popularity. Given the large number of expected devices, the scalability requirements of such applications will be very stringent. Hence, deploying them at the RAN edge can enable the applications to be deployed at scale.

Network Performance: A plurality of services can be designed to improve the network performance and quality of experience (QoE) for users. For example, content/Domain Name System (DNS) caching, video streaming optimizations, Transmission Control Protocol (TCP) congestion control optimizations etc. at the RAN edge may significantly improve end-user performance in accordance with various embodiments of the present principles.

In some embodiments, Edge Applications (e.g., AR) may include the following characteristics: (a) Highly responsive: overlay information (graphics, text or video) may be shown over the live video of the user's environment in real-time; (b) Intensive Computation: Too slow to run completely on mobile; and (c) Have centralized databases in the server. In accordance with the present principles, end to end latency may be affected by various factors, including: (a) network bandwidth & latency: time to upload video frames to cloudlet server, (b) cloudlet/edge server load: the traffic and application processing load of the cloudlet platform should be kept low; and (c) matching compute latency: objects of interest in current frame are matched with objects in database to provide relevant information. In one embodiment, a framework for Mobile Networks that effectively reduces the latencies to enable Edge apps (e.g., AR) may be implemented according to the present principles.

Before describing the present principles in detail, some background on LTE networks will be provided for ease of illustration of various embodiments. In some embodiments, an LTE network may include a Radio Access Network (RAN) and an Evolved Packet Core (EPC). While the RAN may include includes Evolved Node Bs (eNodeBs)/base stations that serve the user equipment/devices (UEs), the EPC may include both the control-plane entities that manage the devices and data-plane entities that route the data traffic. The control-plane elements mainly consist of the Mobility Management Entity (MME) and the Home Subscriber Server (HSS). The data-plane elements may include, for example, both standardized LTE gateways and middle boxes that perform specific network functions. It is noted that LTE gateways may primarily perform routing of user data traffic along with other functions.

In some embodiments, packets from one or more eNodeBs may be routed through two gateways, namely the Serving Gateway (SGW) and the Packet Data Network Gateway (PDN-GW). A primary function of the SGWs may be to perform mobility by maintaining the data path between eNodeBs and the PDN-GW as a UE moves across a set of eNodeBs.

In some embodiments, the PDN-GW may be the anchor point for sessions towards external networks, and may act as an internet gateway for the data traffic. The PDN-GW also may enforce operator-defined policies (e.g., Quality of Service (QoS)), packet filtering and charging support according to various embodiments. Operators typically deploy the SGW in regional Points-of-Presence (PoPs) to manage a plurality of eNodeBs (e.g., hundreds, thousands, etc.). However, the PDN-GW deployments may be more centralized to, for example, avoid handovers across PDN-GWs during user mobility and to reduce their provisioning costs by provisioning resources for a larger area in accordance with the present principles.

In some embodiments, the data traffic of each UE may be carried over a bearer, which may be the datapath between the UE and the PDN-GW. The bearer of each UE may be composed of three segments: (i) radio bearer between UE and eNodeB, (ii) data bearer between eNodeB and SGW and (iii) data bearer between SGW and PDN-GW. In an embodiment, except for the radio bearer, the latter two bearers may be carried over General Packet Radio Service (GPRS)

Tunneling Protocol (GTP) based User Datagram Protocol (UDP) tunnels as defined in the 3 Generic Packetized Protocol (3GPP) standard.

In some embodiments, when a UE registers with the network, a default bearer may be created for the UE to ensure always-on connectivity. The default bearer may be maintained according to several procedures for a UE as defined in the LTE standards. These procedures may include, for example. Registration, Idle Mode, and Re-attach. With respect to Registration, when a UE initially registers with the network, the MME may assign a SGW and PDN-GW to the UE. As the UE transitions from Idle to Active mode and back, it may always be served by the same SGW and PDN-GW unless it moves to a different area not served by the assigned SGW and PDN-GW.

In one embodiment, after a time period (e.g., seconds) of inactivity, the UE may make a transition to Idle Mode. During this phase, the state of the bearer from the eNodeB to the SGW may be destroyed, but the bearer state between the SGW and PDN-GW may be maintained by both entities according to the present principles. In addition, the SGW and PDN-GW may hold other state information (e.g., QoS, etc.) related to the UE. With respect to the Re-attach, while in the Idle mode, if a UE wants to send a packet, the MME may re-establish the bearer from the current eNodeB to the assigned SGW in accordance with the present principles.

In some embodiments, in addition to ensuring routing, a bearer also may define the QoS (e.g., how the UE data is treated when it travels across the network). Table 1, below, shows the different classes of QoS that may be supported by the LTE standard. Two classes of QoS are defined: GBR (Guaranteed Bit-Rate) for real-time traffic and Non-GBR for best effort traffic.

TABLE 1

QoS Traffic Classes Defined in LTE

| QCI | Bearer Type | Priority | Packet Delay | Packet Loss | Example |
|---|---|---|---|---|---|
| 1 | GBR | 2 | 100 ms | $10^{-2}$ | VoIP Call |
| 2 | | 4 | 150 ms | $10^{-3}$ | Video Call |
| 3 | | 3 | 50 ms | | Online Gaming (Real Time) |
| 4 | | 5 | 300 ms | $10^{-6}$ | Video Streaming |
| 5 | Non-GBR | 1 | 100 ms | | IMS Signaling |
| 6 | | 6 | 300 ms | | Video, TCP based services (e.g., email, chat, ftp, etc.) |
| 7 | | 7 | 100 ms | $10^{-3}$ | Voice, Video, Interactive Gaming |
| 8 | | 8 | 300 ms | $10^{-6}$ | Video, TCP based services (e.g., email, chat, ftp, etc.) |
| 9 | | 9 | | | |

In some embodiments, the default bearer may be defined as best-effort (e.g., a non-GBR class). However, each UE can request for additional dedicated bearers for one or more specific traffic flows or applications (e.g., VoIP, video etc.). The dedicated bearers are typically defined as GBR, but they can be defined as non-GBR flows if necessary. Each dedicated bearer may be defined by a Traffic flow templates (TFT) that includes, for example, the 5-tuple IP flow information to enable classifying the traffic that needs to be carried over the dedicated bearer. The dedicated bearers may be assigned a separate GTP tunnel from the default bearer. For example, a separate dedicated bearer may be created for the UE to ensure a good QoE for a video streaming application (e.g., Netflix®). Other best-effort traffic from applications such as, for example, Dropbox® may be carried over the default bearer.

Conventional LTE network architecture limits the placement of cloudlets or compute servers close to or within the RAN. The primary reason for this limitation is that the user traffic is carried over GTP based UDP tunnels between the eNodeBs and the Serving Gateways (SGWs). Although the traffic between the eNodeBs and the SGWs is carried over IP, the additional GTP and UDP headers over the inner IP headers ensure that regular switches cannot be deployed to dynamically switch traffic to locally deployed MEC Servers.

One approach to resolve limitations from conventional MEC platforms may include deploying a middlebox between the eNodeB and the SGWs. The middlebox may be co-located with the MEC server. All traffic from the eNodeB would be routed through the middlebox, and any incoming packets from the network into the middlebox would first pass a GTP decap component to expose the inner IP header. The packet would then be classified as either belonging to a flow that is meant to be passed to the local MEC Server, or belonging to a flow that has to be forwarded to the network (e.g., eNodeB in the case of downlink traffic and SGW in the case of uplink traffic). In case the packet belongs to a flow that is meant to be forwarded to either the eNodeB or the SGW, the GTP header is re-encapped.

However, a limitation of such a scheme is that the middlebox may have to be provisioned to handle all the traffic in the mobile network. Although the forwarding and classification functionality could be implemented solely in hardware (e.g., as an open-flow switch), typically such purpose-built hardware is much higher in cost than their software counterparts. Additionally, the platform would need to incorporate modules for user identification, mobility support, accounting and security. Such functions are already provided by the SGW and Packet Data Network Gateway (PDN-GW) that may be inherently bypassed for the local MEC traffic in such a deployment scenario.

An alternate deployment scenario may be to deploy SGW and PDN-GWs at the edge of the network. Although such a deployment would solve some of the problems with the first approach, it would increase provisioning costs further. The gateway resources at each edge location may need to be provisioned for the worst-case traffic load at each location. Recently, with the advent of Network Function Virtualization (NFV), operators generally distribute their gateways across multiple Point of Presences (PoPs) or data-centers to lower end to end delays and multiplex resources for improved load balancing and availability.

However, deploying the gateway resources all the way to the edge is an extreme scenario that may not be cost effective in most scenarios. It is possible to differentiate MEC traffic by using a separate Access Point Name (APN), thus ensuring that the MEC application traffic is assigned to a separate PDN-GW. Hence, the PDN-GWs that are deployed at the edge would only need to route traffic belonging to the MEC server. However, the SGWs would still be shared between MEC traffic and other traffic flows. Thus, such a deployment still may result in excessively high provisioning costs for the SGW resources.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 6:
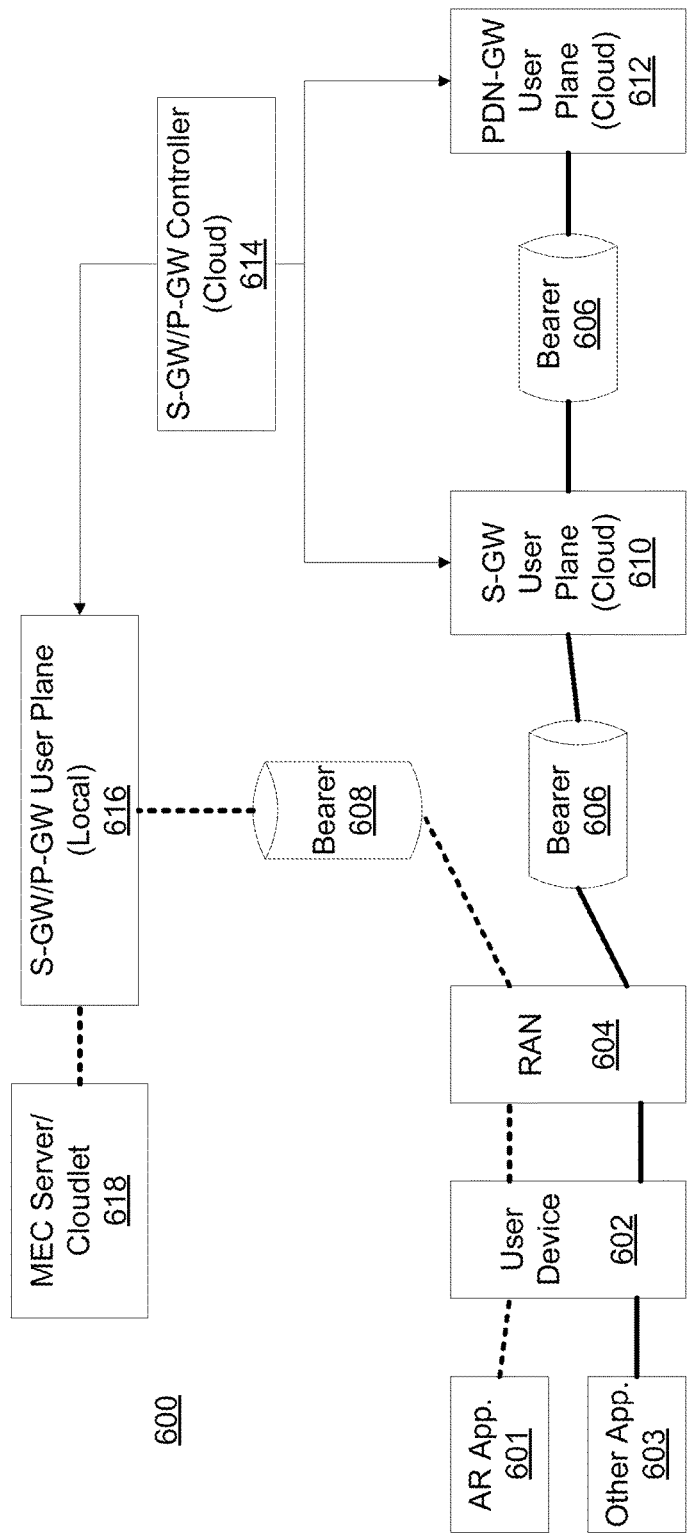
FIG. 6 shows a diagram of an exemplary system for standards compatible edge computing over mobile networks, in accordance with an embodiment of the present principles.
Figure 7:
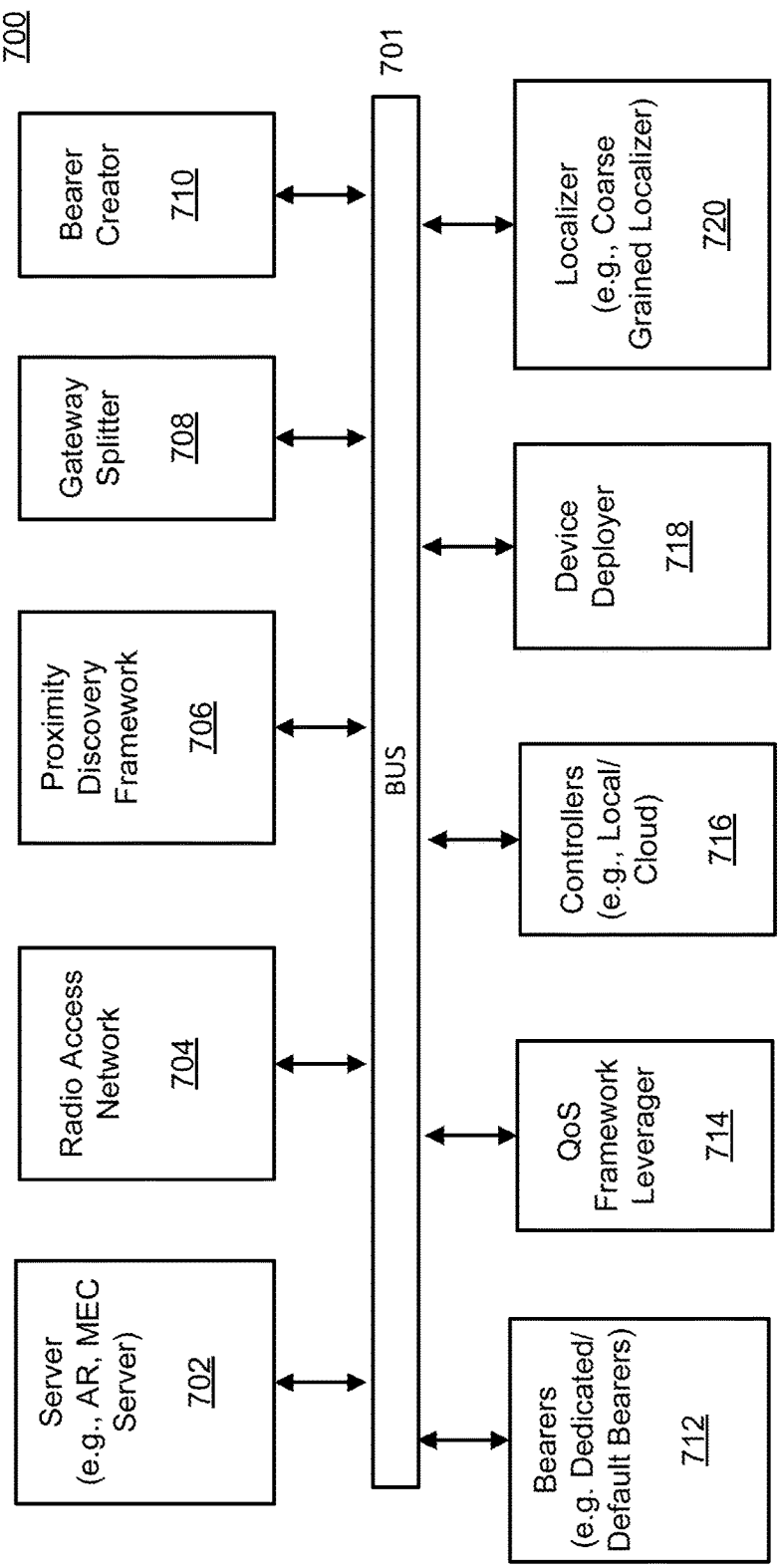
FIG. 7 shows a block/flow diagram of a system for edge computing over mobile networks, in accordance with an embodiment of the present principles.

Moreover, it is to be appreciated that systems 100, 600, and 700, described with respect to FIGS. 1, 6, and 7, respectively, are systems for implementing respective embodiments of the present principles. Part or all of processing system 100 may be implemented in one or more of the elements of systems 600 and 700 according to various embodiments of the present principles.

Figure 2:
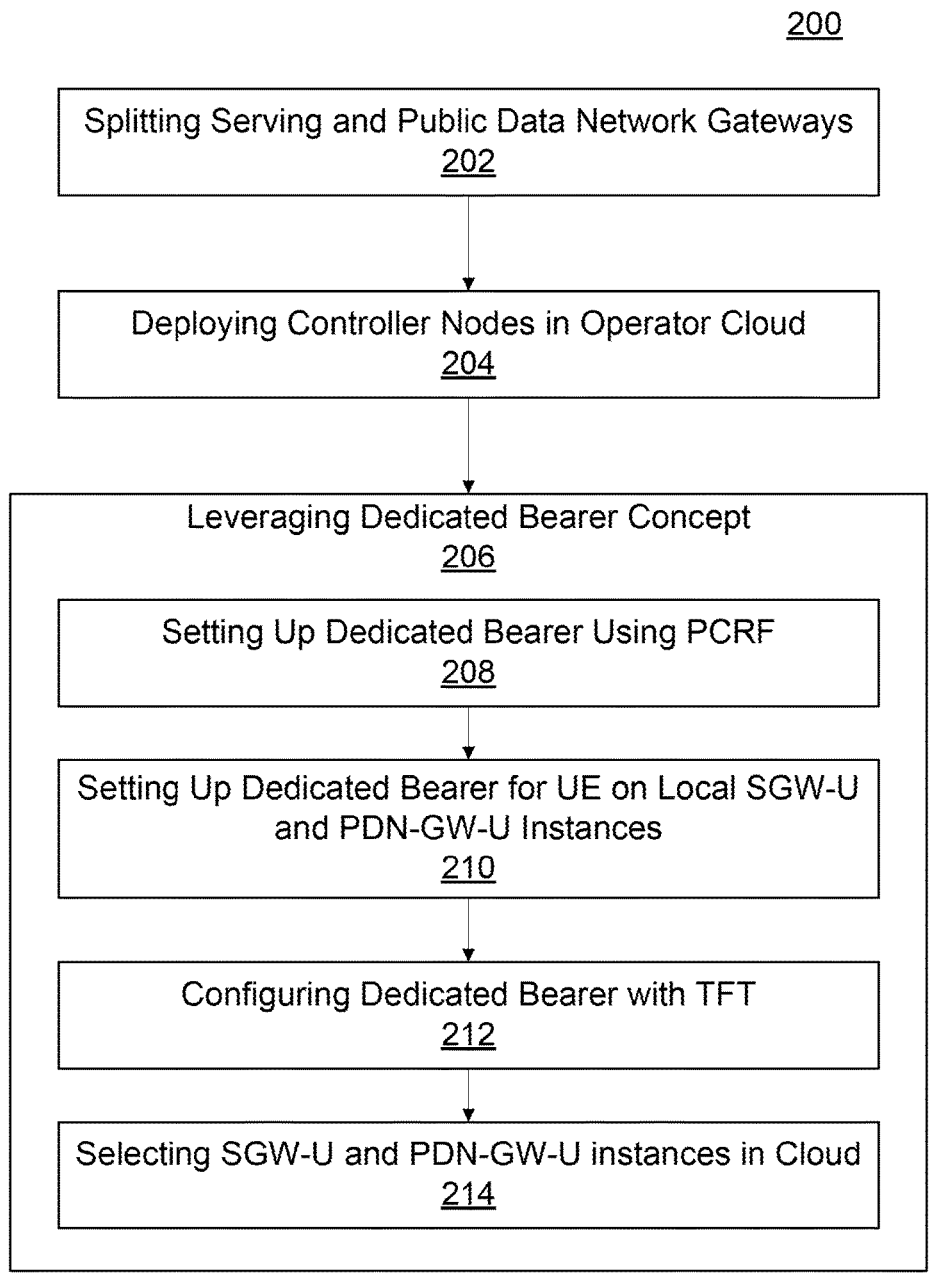
FIG. 2 shows a block/flow diagram of a high level method for standards compatible edge computing over mobile networks, in accordance with an embodiment of the present principles.

Further, it is to be appreciated that processing system 100 may perform at least part of the method described herein including, for example, at least part of method 2 of FIG. 2. Similarly, part or all of systems 600 and 700 may be used to perform at least part of method 2 of FIG. 2 according to various embodiments of the present principles.

Referring now to FIG. 2, a high level block/flow diagram of a method 200 for standards compatible edge computing over mobile networks is illustratively depicted in accordance with the present principles. The method may include an LTE standards compatible framework which enables compute resources, cloudlets, or servers close to, or at the Radio Access Network (RAN) (or eNodeBs) to enable MEC applications in accordance with the present principles.

In one embodiment, the Serving and Public Data Network (PDN)-gateways of LTE may be split in block 202 to provision sufficient resources to deploy instances of the SGW-U and PDN-GW-U (data-plane entities) locally at the RAN edge along with the cloudlet in accordance with the present principles. In block 204, the SGW-C and PDN-GW-C (controllers) nodes may be deployed in the operator cloud along with other SGW-U and PDN-GW-U nodes that would route regular OTT and operator traffic (e.g., not belonging to the cloudlet applications). Deploying instances of SGW-U and PDN-GW-U locally enables cloudlet applications to work seamlessly just like today's mobile applications. Moreover, the operator does not need to deploy or implement a framework to include user identification, mobility across eNodeBs, authentication, security and accounting in accordance with various embodiments.

In block 206, the dedicated bearer concept in LTE may be leveraged to ensure that only the traffic from cloudlet applications are routed through the local SGW-U and PDN-GW-U instances. This step ensures that the provisioning for local resources is limited to the traffic generated by the cloudlet traffic, and by leveraging the dedicated bearer concept, this functionality may be realized without changes to eNodeBs. SGWs and standard LTE interfaces in accordance with the present principles.

In one embodiment, in block 208, when a cloudlet application needs connectivity, the LTE network may set-up a dedicated bearer using the interface available through Policy and Charging Rules Function (PCRF) in accordance with the present principles. In block 210, when the appropriate SGW-C and PDN-GW-C receive the request, they may setup the dedicated bearer for the UE on the local SGW-U and PDN-GW-U instances. Additionally, in block 212, the dedicated bearer may be configured with the Traffic Flow Template (TFT) including the IP address of the cloudlet server, to ensure that only traffic belonging to the cloudlet applications are routed through the local SGW-U and PDN-GW-U. Instead, in block 214, for the default bearer or a dedicated bearer used for other traffic types, the SGW-C and PDN-GW-C may select SGW-U and PDN-GW-U instances in the cloud in accordance with the present principles.

Figure 3:
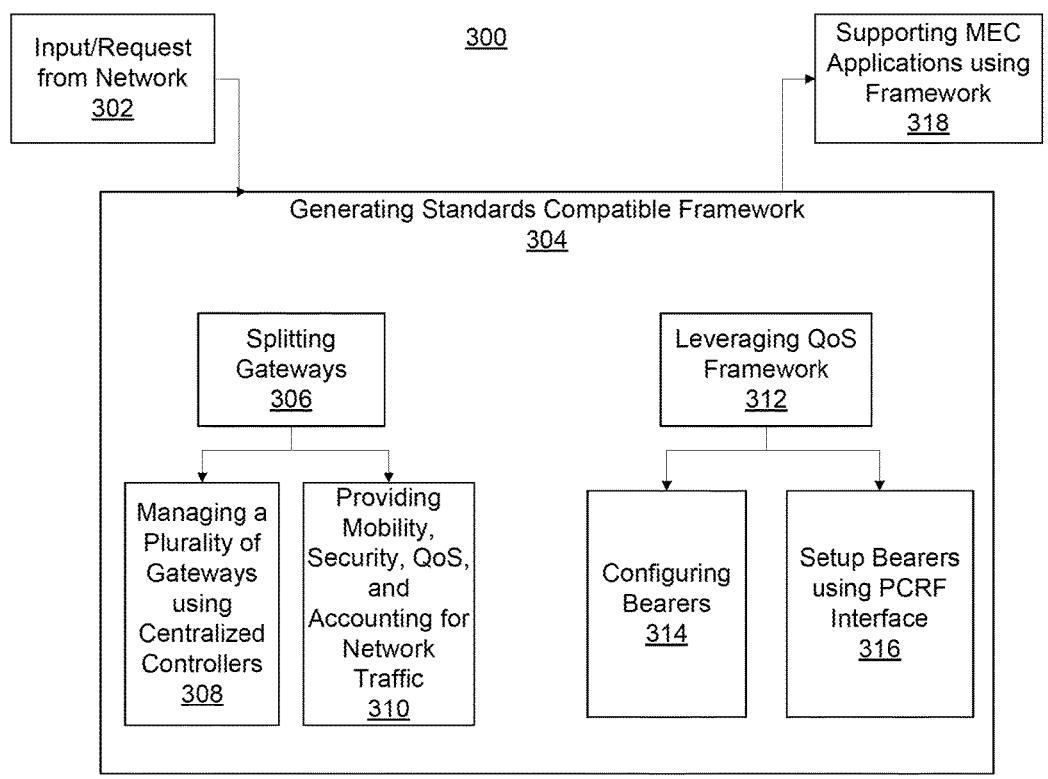
FIG. 3 shows a block/flow diagram of a method for standards compatible edge computing over mobile networks, in accordance with an embodiment of the present principles.

Referring now to FIG. 3, a block/flow diagram of a method 300 for standards compatible edge computing over mobile networks is illustratively depicted in accordance with the present principles. In one embodiment, input may be received in block 302 from a cellular network (e.g., LTE) with base stations and EPC network serving one or more user's application traffic. In block 304, an LTE standards compatible framework may be generated to enable computing resources, cloudlets, and/or servers close to, or at the RAN (or eNodeBs) to enable MEC applications in accordance with the present principles.

In block 306, a software-defined LTE network may be generated by splitting serving gateways (SGWs) and Packet-data network gateways (PDN-GWs) into control part (e.g., SGW-C and PGW-C) and data-plane part (e.g., SGW-U and PDN-GW-U). In some embodiments, SGW-C, PDN-GW-C can be placed in operator's cloud or PoP. IN one embodiment, most SGW-U, PDN-GW-U servers or VMs will be placed in the operator's cloud. A few SGW-U and PDN-GW-U may be placed at the RAN edge along with, or close to the eNodeBs. These local SGW-U. PDN-GW-U may forward/route only the traffic belonging to the MEC applications to the cloudlet servers. Other traffic may be directly forwarded from the eNodeB to the SGW-U/PDN-GW-U in the cloud in accordance with the present principles.

With the advent of Network Function Virtualization (NFV), several equipment vendors are moving towards software based implementations of the EPC entities from traditional purpose-built hardware implementations. In one embodiment, in the context of the SGW and the PDN-GW, the components may be split into control-plane entities, (e.g., SGW-C and PDN-GW-C) and user-plane entities (e.g., SGW-U and PDN-GW-U) in block 306 in accordance with the present principles. A main responsibility of the SGW-C and PDN-GW-C is to interact with other entities, such as the MME and PCRF, using 3GPP standard interfaces and to setup the routes for the different UE flows on the SGW-U and PDN-GW-U entities. Similar to the concept of software defined networking (SDN), each SGW-C or PDN-GW-C may control several SGW-U or PDN-GW-U nodes.

Such a split has various advantages in accordance with the present principles. For example, the split in block 306 ensures that the control-plane and user-plane components of the SGW and PDN-GW can scale independent of each other. For instance, many IoT devices (e.g., smart meters, sensors, etc.) may generate relatively less traffic per device compared to the amount of control traffic, while applications on smartphones (e.g., video streaming) generate more data traffic than control signaling. The independent scaling of user- and control-plane components of SGW and PDN-GW in accordance with the present principles ensure a more efficient provisioning.

Furthermore, in various embodiments, the split in block 306 enables more efficient load-balancing across the SGWs and the PDN-GWs than conventional implementations. Since, it is difficult to predict the traffic requirements of the UEs beforehand, the SGW-C and PDN-GW-C can perform fine-grained load-balancing by selecting the SGW-U and PDN-GW-U in real time as UEs become active. In conventional networks, a SGW and a PDN-GW are statically assigned to a UE, and the assignment is only changed when the UE moves to a different area that is not served by its current SGW. Such an assignment requires over-provisioning of SGW and PDN-GW resources to avoid overloading on the datapath. However, by splitting the SGWs and PDN-GWs in accordance with the present principles, although the SGW-C and PDN-GW-C may be statically assigned to a UE, the SGW-U and PDN-GW-U could be dynamically assigned/re-assigned without affecting the 3GPP interfaces.

The split in block 306 also enables more flexibility to the operators to distribute the gateway resources across data centers. The control-plane entities, SGW-C and PDN-GW-C, may be logically or physically centralized to manage multiple SGW-Us and PDN-GW-Us that are distributed across data-centers. Such a flexibility increases resource-multiplexing capabilities across datacenters, thereby reducing both provisioning costs and delays for user traffic in accordance with various embodiments.

In block 308, each SGW-C, PDN-GW-C (e.g., controllers) may manage several SGW-U. PDN-GW-U. Some of the SGW-U/PDN-GW-U may be located at the edge of the network, and the SGW-C/PDN-GW-C may use the IP address of the eNodeB serving the UE to select the correct SGW-C/PDN-GW-C among multiple edge locations in accordance with the present principles. In block 310, the SGW-U, PDN-GW-U placed in the RAN edge may provide mobility, security. QoS, and/or accounting for the traffic belonging to the MEC applications in accordance with various embodiments.

In block 312, the QoS framework of LTE may be leveraged according to various embodiments of the present principles. In one embodiment, when an MEC application needs connectivity, the LTE network may set-up a dedicated bearer using the interface available through PCRF. When the appropriate SGWC and PDN-GW-C receive the request, they may setup the dedicated bearer for the UE on the local SGW-U and PDN-GW-U instances. Moreover, for the default bearer or a dedicated bearer used for other traffic types, the SGW-C and PDN-GW-C may select SGW-U and PDN-GW-U instances in the cloud in accordance with the present principles.

In one embodiment, in block 312, the split architecture from block 306 may be leveraged to provision sufficient resources to deploy instances of the SGW-U and PDN-GW-U locally at the RAN edge, along-with the MEC server or cloudlet. The SGW-C and PDN-GW-C nodes may be deployed in the operator cloud along with other SGW-U and PDN-GW-U nodes that would route regular OTT and operator traffic not belonging to the MEC applications. Deploying instances of SGW-U and PDN-GW-U locally ensures that MEC applications would work seamlessly just like today's mobile applications. Moreover, the operator does not need to deploy or implement a frame work to include user identification, mobility across eNodeBs, authentication, security and accounting in accordance with the present principles.

In block 314, the dedicated bearer may be configured with the TFT including the IP address of the MEC server to ensure that only traffic belonging to the MEC applications. In one embodiment, in block 314, the present principles may be employed to ensure that only the traffic from MEC applications are routed through the local SGW-U and PDN-GW-U instances. This step would ensure that the provisioning for local resources is limited to the traffic generated by the MEC traffic. To realize such a functionality without changes to eNodeBs. SGWs and standard LTE interfaces, the present principles leverage the dedicated bearer concept in LTE in block 312.

In one embodiment, when an MEC application needs connectivity, the LTE network sets-up a dedicated bearer in block 316 using the interface available through PCRF. When the appropriate SGW-C and PDN-GW-C receive the request, they setup the dedicated bearer for the UE on the local SGW-U and PDN-GW-U instances. Additionally, the dedicated bearer is configured with the TFT including the IP address of the MEC server in block 314, to ensure that only traffic belonging to the MEC applications are routed through the local SGW-U and PDN-GW-U.

In one embodiment, in block 316, for the default bearer or a dedicated bearer used for other traffic types, the SGW-C and PDN-GW-C may select SGW-U and PDN-GW-U instances in the cloud. For example, a UE may access an MEC application provided by Netflix® and the Dropbox® applications simultaneously in accordance with the present principles. While the Dropbox® traffic may be carried over the default bearer using the SGW and PDN-GW in the cloud, the Netflix® traffic may be carried over the dedicated bearer using the SGW and PDN-GW placed close to the RAN in accordance with various embodiments.

In block 316, the PDN-GW-C may initiate the creation of a new bearer with QCI (QoS) and TFT details, as specified in the Policy Control and Charging (PCC) rule provided by the PCRF. The PDN-GW-C uses the service identifier field in the PCC rules to differentiate a MEC application or service from regular applications. The PDN-GW-C uses this information to create the dedicated bearer for MEC applications on local S/PDN-GW-U instances instead of the cloud S/PDN-GW-U instances in accordance with the present principles. In block 318, the present principles may be employed to efficiently support a new class of MEC applications (e.g., Augmented Reality, Mobile Advertising, etc.) on conventional LTE networks by, for example, leveraging the high-bandwidth, low delay, and user location and context provided at the mobile edge or eNodeBs in accordance with the present principles.

Figure 4:
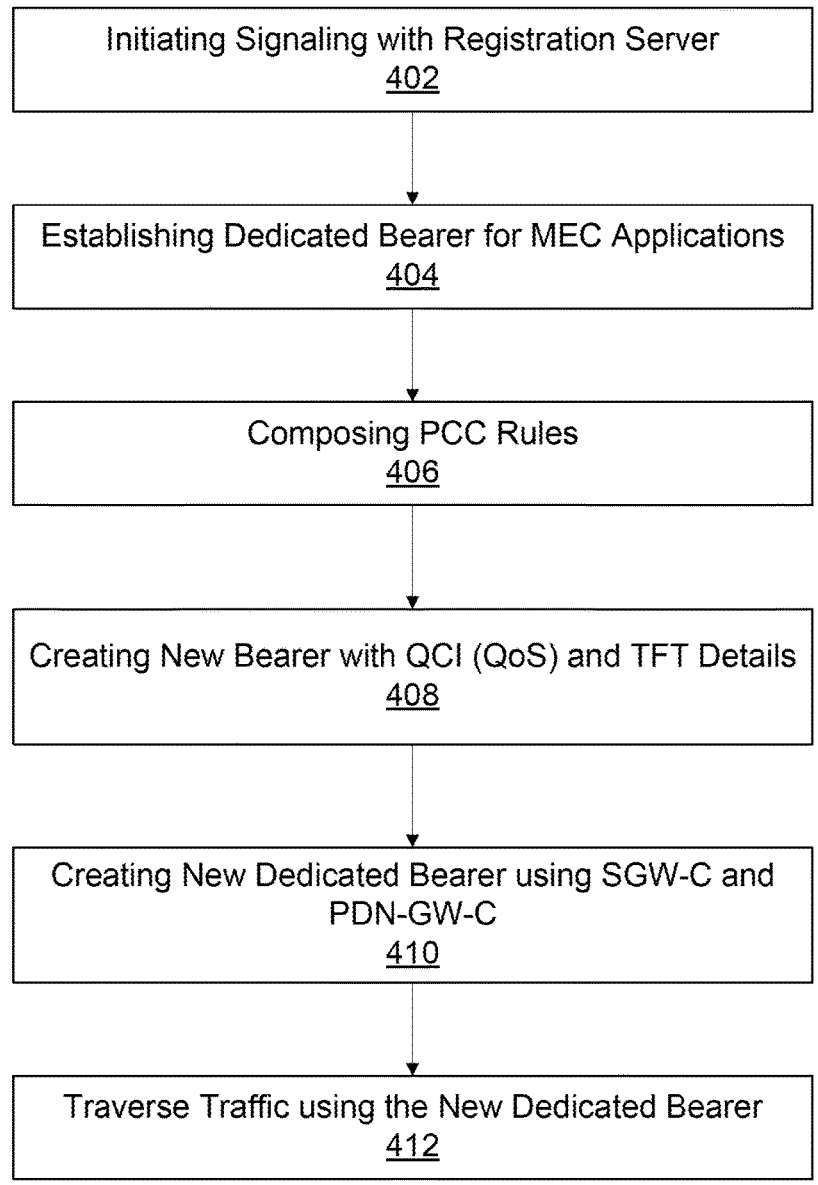
FIG. 4 shows a block/flow diagram of a method for setting up dedicated bearers for MEC applications, in accordance with an embodiment of the present principles.

Referring now to FIG. 4, a block/flow diagram of a method 400 for setting up dedicated bearers for MEC applications is illustratively depicted in accordance with the present principles. The detailed method 400 is illustrated herein below in the following steps once the UE has successfully established connectivity with the LTE network in accordance with the present principles.

In one embodiment, upon request for connectivity from a particular MEC Application, the registration service on the UE may initiate signaling with the registration server using the default bearer in block 402. The event(s) that trigger an MEC Application to request connectivity may include, for example, a location of a user. Furthermore, in block 402, a registration server may authenticate the UE before requesting connectivity on-behalf of the UE in accordance with various embodiments of the present principles.

In block 404, once the application level signaling is successful, the registration server may establish a dedicated bearer for the MEC application. It may trigger PCRF through an Rx interface (e.g., as defined in 3GPP) to generate a new policy rule. The registration server may provide the PCRF with an application identifier, IP-flow information (e.g., source, destination IP addresses and port numbers), and QoS information in accordance with the present principles. The registration server may employ a common identifier and QoS information for all the MEC applications, or a different QoS profile for each MEC application in accordance with various embodiments.

In block 406. PCRF may compose a PCC rule that includes the service identifier, QoS requirements, and TFT information, as specified by the Registration Server. The specifics of the PCC rule generation are defined in the 3GPP standard. Once the PCC rules are generated dynamically, the PCRF may invoke the PDN-GW-C via the Gx interface in block 406, thus resulting in a Network initiated dedicated bearer creation in accordance with the present principles.

In one embodiment, the PDN-GW-C may initiate the creation of a new bearer with Quality Control Index (QCI) (QoS) and TFT details as specified in the PCC rule provided by the PCRF in block 408. The bearer binding component in the PDN-GW-C may be responsible for the creation of the bearer. In one embodiment, the bearer binding component of the PDN-GW-C may be modified according to the present principles to ensure that a new dedicated bearer is created using the appropriate local PDN-GW-U instead of the cloud PDN-GW-U. The PDN-GW-C may use the service identifier field in the PCC rules to differentiate a MEC application or service from regular applications. Using this information, PDN-GW-C may select a local PDN-GW-U for dedicated bearers for MEC Applications and may select a cloud PDN-GW-U for dedicated bearers for non-MEC Applications in accordance with various embodiments.

In one embodiment, in block 408, this information may be shared with the SGW-C, so that it can also select the local SGW-U instead of the cloud SGW-U. Additionally, the SGW-C may leverage the IP address of the eNodeB that is currently serving the UE. This enables the SGW-C to select the correct local SGW-U in case there are multiple local SGW-U placed at different locations managed by the same SGW-C, or the same SGW-C pool. The SGW-C may share this information with the PDN-GW-C in block 408 to select the correct local PDN-GW-U in accordance with the present principles.

In block 410, the SGW-C and PDN-GW-C may initiate the creation of a new dedicated bearer by sending a message to the MME with the eNodeB-SGW bearer information including the IP address of the selected local SGW-U and the GTP tunnel identifier of the SGW-U. The MME may forward the message to the eNodeB that is currently serving the UE, and the eNodeB and the UE create the radio bearer and the TFT is installed at the UE. The eNodeB also may send the GTP tunnel identifier of the eNodeB to the MME. In one embodiment, the MME may forward the tunnel identifier to the SGW-C that configures the information at the local SGW-U in accordance with the present principles. In block 412, once the MME activates the dedicated bearer on the eNodeB and the SGW-C, the traffic generated by the MEC application may traverse via the dedicated bearer directly to the local MEC server in accordance with the present principles.

Figure 5:
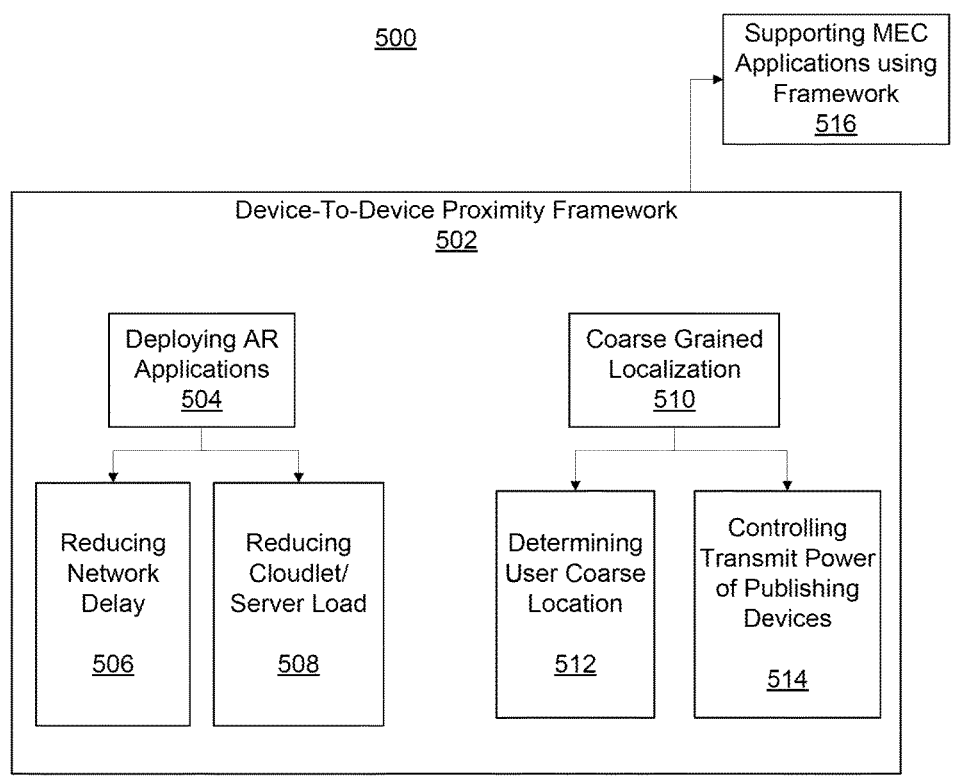
FIG. 5 shows a block/flow diagram of a method for device-to-device proximity discovery, in accordance with an embodiment of the present principles.

Referring now to FIG. 5, a block/flow diagram of a method 500 for device-to-device proximity discovery is illustratively depicted in accordance with the present principles. The method 500 may be employed for applications such as Augmented Reality (AR), which need to be highly responsive. In block 502, a device-to-device proximity discovery framework may be employed to reduce network delay and computational delay for applications (e.g., AR application), to enable feasibility over LTE networks in accordance with various embodiments of the present principles.

In one embodiment, LTE devices may be deployed to broadcast (or publish) AR applications in block 504. The present principles enable efficient service availability by automatically setting up network routing only for users that have subscribed to AR service for a particular interest (e.g., AR for laptops section in retail store) in block 504. In block 506, network delay may be reduced by setting, or configuring routes for AR traffic for one or more users to a local cloudlet (or edge server) deployment close to a particular base station in accordance with the present principles. In block 508, cloudlet or edge server load may be reduced by selectively forwarding only AR traffic to a local cloudlet or server.

In block 510, coarse grained localization may be performed in accordance with various embodiments of the present principles. The LTE based devices that broadcast AR service may also act as present points to leverage presence of users/devices to reduce compute delays. In some embodiments, localizing the user in block 510 may reduce the search space during object matching, and the user location may be continuously provided to the AR app to improve efficiency by reducing object/image matching compute times according to the present principles.

In block 512, the coarse-location of a user may be determined by the location of the publisher it received information from. The AR apps may maintain a hierarchical database, and the AR app may, for example, match the object(s) from a user's camera with the objects in that location. If there is no match, the AR app may then match with all the objects pertaining to that interest in accordance with the present principles.

In block 514, the localization can be further improved by controlling transmit power of the publishing devices, and using signal strength measurements at the subscribers (or users). This tracking may include, for example, tracking a user within a retail section, which may use high transmit power and/or tracking a user within a retail isle, which may use lower transmit power. In block 516, the present principles may be employed to efficiently support a new class of MEC applications (e.g., Augmented Reality, Mobile Advertising, etc.) on conventional LTE networks to enable usage of AR, which provides a richer and more engaging experience to customers in, for example, retail, stadiums, hotels, etc. in accordance with various embodiments of the present principles.

Referring now to FIG. 6, a diagram of an exemplary system 600 for standards compatible edge computing over mobile networks is illustratively depicted in accordance with the present principles. The system 600 may leverage existing QoS framework of LTE with no changes to standard protocols and base stations without using middle boxes by, for example, dynamically setting up routes for Edge apps traffic to local S/P-gateways in accordance with the present principles. In one embodiment a user/device 602 may request connectivity from a particular AR application 601 (e.g., Netflix®), an/or other applications 603 (e.g., Facebook®, Dropbox®)). One or more RANs 604 may be employed, and the system 600 may include a split architecture in accordance with various embodiments.

In one embodiment, a default bearer 606 (e.g., default GTP bearer) and a dedicated bearer 608 (e.g., dedicated GTP bearer) may be employed in accordance with the present principles. In some embodiments, the S-GW user plane 610 (S-GW-U) (cloud) and PDN-GW user plane 612 (PDN-GW-U) (cloud) may be split to avoid overprovisioning of resources. In one embodiment, control plane entities S-GW/P-GW controllers 614 (S-GW-C/P-GW-C) may be logically or physically centralized to manage multiple SGW-Us and PDN-GW-Us that may be distributed across data centers in accordance with the present principles. The system 600 may be further configured to provision sufficient resources to deploy instances of the S-GW-U and PDN-GW-U locally 616 at the RAN 604 edge along with an MEC server/cloudlet 618 to efficiently provide access to various applications (e.g., AR applications) in accordance with the present principles.

Referring now to FIG. 7, an exemplary system 700 for standards compatible edge computing over mobile networks is illustratively depicted in accordance with the present principles.

While many aspects of system 700 are described in singular form for the sakes of illustration and clarity, the same can be applied to multiples ones of the items mentioned with respect to the description of system 700. For example, while a single server 702 is described, more than one server 702 can be used in accordance with the teachings of the present principles, while maintaining the spirit of the present principles. Moreover, it is appreciated that the server 702 is but one aspect involved with system 700 than can be extended to plural form while maintaining the spirit of the present principles.

The system 700 can include a bus 701, a server 702, a radio access network 704, a proximity discovery framework 706, a gateway splitter 708, a bearer creator 710, and one or more bearers 712 in accordance with various embodiments of the present principles. A QoS framework leverage 714, a device deployer 718, and a localizer 720 may also be employed in accordance with various embodiments. One of more controllers 716 may be employed to control system 700 operation in accordance with the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for standards compatible Mobile Edge Computing (MEC), comprising:

splitting Serving gateways (SGWs) and Packet Data Network gateways (PDN-GWs) to provision sufficient resources to deploy data-plane entity instances locally at a Radio Access Network (RAN) edge with one or more cloudlets;

deploying one or more local controller nodes in one or more operator clouds;

leveraging a dedicated bearer to route traffic, using one or more of the local controller nodes, from the one or more cloudlets through the split SGs and PDNs;

configuring the dedicated bearer with a traffic flow template (TFT) including an Internet Protocol (IP) address of the one or more cloudlets; and providing one or more user devices efficient access to one or more MEC applications at the RAN edge using the dedicated bearer.

2. The method of claim 1, wherein the configuring the dedicated bearer further comprises initiating application level signaling by the one or more user devices upon receiving a request from the one or more MEC applications.

3. The method of claim 1, wherein the configuring the dedicated bearer further comprises composing a policy control and charging (PCC) rule that includes a service identifier, Quality of Service (QoS) requirements, and TFT information specified by one or more registration servers.

4. The method of claim 1, further comprising initiating a creation of a new dedicated bearer using one or more controllers by sending a message to a Mobility Management Entity (MME) with eNodeB-SGW bearer information including an IP address of a selected local SGW.

5. The method of claim 4, wherein the bearer information includes a General Packet Radio Service (GPRS) Tunneling Protocol (GTP) tunnel identifier of the selected local SGW.

6. The method of claim 1, further comprising reducing network delay and computational delay for Augmented Reality (AR) applications using a device-to-device proximity discovery framework.

7. The method of claim 6, wherein network routing is configured only for users subscribed to a particular AR service on the device-to-device proximity discovery framework.

8. A system for standards compatible Mobile Edge Computing (MEC), comprising:

a splitter for splitting Serving gateways (SGWs) and Packet Data Network gateways (PDN-GWs) to provision sufficient resources to deploy data-plane entity instances locally at a Radio Access Network (RAN) edge with one or more cloudlets; and a processor coupled to a computer-readable storage medium, the processor being configured to:

deploy one or more local controller nodes in one or more operator clouds;

leverage a dedicated bearer to route traffic, using one or more of the local controller nodes, from the one or more cloudlets through the split SGs and PDNs;

configure the dedicated bearer with a traffic flow template (TFT) including an Internet Protocol (IP) address of the one or more cloudlets; and provide one or more user devices efficient access to one or more MEC applications at the RAN edge using the dedicated bearer.

9. The system of claim 8, wherein configuration of the dedicated bearer further comprises initiating application level signaling by the one or more user devices upon receiving a request from the one or more MEC applications.

10. The system of claim 8, wherein configuration of the dedicated bearer further comprises composing a policy control and charging (PCC) rule that includes a service identifier, Quality of Service (QoS) requirements, and TFT information specified by one or more registration servers.

11. The system of claim 8, further comprising one or more controllers configured to initiate creation of a new dedicated bearer by sending a message to a Mobility Management Entity (MME) with eNodeB-SGW bearer information including an IP address of a selected local SGW.

12. The system of claim 11, wherein the bearer information includes a General Packet Radio Service (GPRS) Tunneling Protocol (GTP) tunnel identifier of the selected local SGW.

13. The system of claim 8, further comprising a device-to-device proximity discovery framework to reduce network delay and computational delay for Augmented Reality (AR) applications.

14. The system of claim 13, wherein network routing is configured only for users subscribed to a particular AR service on the device-to-device proximity discovery framework.

15. A non-transitory computer-readable storage medium including a computer-readable program for standards compatible Mobile Edge Computing (MEC), wherein the computer-readable program when executed on a computer causes the computer to perform the steps of:

splitting Serving gateways (SGWs) and Packet Data Network gateways (PDN-GWs) to provision sufficient resources to deploy data-plane entity instances locally at a Radio Access Network (RAN) edge with one or more cloudlets;

deploying one or more local controller nodes in one or more operator clouds;

leveraging a dedicated bearer to route traffic, using one or more of the local controller nodes, from the one or more cloudlets through the split SGs and PDNs;

configuring the dedicated bearer with a traffic flow template (TFT) including an Internet Protocol (IP) address of the one or more cloudlets; and providing one or more user devices efficient access to one or more MEC applications at the RAN edge using the dedicated bearer.

16. The non-transitory computer-readable storage medium of claim 15, wherein the configuring the dedicated bearer further comprises initiating application level signaling by the one or more user devices upon receiving a request from the one or more MEC applications.

17. The non-transitory computer-readable storage medium of claim 15, wherein the configuring the dedicated bearer further comprises composing a policy control and charging (PCC) rule that includes a service identifier, Quality of Service (QoS) requirements, and TFT information specified by one or more registration servers.

18. The non-transitory computer-readable storage medium of claim 15, further comprising initiating a creation of a new dedicated bearer using one or more controllers by sending a message to a Mobility Management Entity (MME) with eNodeB-SGW bearer information including an IP address of a selected local SGW.

19. The non-transitory computer-readable storage medium of claim 18, wherein the bearer information includes a General Packet Radio Service (GPRS) Tunneling Protocol (GTP) tunnel identifier of the selected local SGW.

20. The non-transitory computer-readable storage medium of claim 15, further comprising reducing network delay and computational delay for Augmented Reality (AR) applications using a device-to-device proximity discovery framework, wherein network routing is configured only for users subscribed to a particular AR service on the device-to-device proximity discovery framework.

* * * * *